United States Patent
Kershaw et al.

(10) Patent No.: US 8,255,446 B2
(45) Date of Patent: Aug. 28, 2012

(54) APPARATUS AND METHOD FOR PERFORMING REARRANGEMENT AND ARITHMETIC OPERATIONS ON DATA

(75) Inventors: Daniel Kershaw, Cambridge (GB); Mladen Wilder, Cambridge (GB); Dominic Hugo Symes, Cambridge (GB)

(73) Assignee: ARM Limited, Cambridge (GB)

( * ) Notice: Subject to any disclaimer, the term of this patent is extended or adjusted under 35 U.S.C. 154(b) by 1307 days.

(21) Appl. No.: 11/987,323

(22) Filed: Nov. 29, 2007

(65) Prior Publication Data

US 2008/0140750 A1  Jun. 12, 2008

(30) Foreign Application Priority Data

Dec. 12, 2006 (GB) .................................. 0624774.6
Oct. 30, 2007 (GB) .................................. 0721324.2

(51) Int. Cl.
*G06F 7/38* (2006.01)
(52) U.S. Cl. ....................................................... 708/490
(58) Field of Classification Search .................. 708/490; 712/22

See application file for complete search history.

(56) References Cited

U.S. PATENT DOCUMENTS

| | | | |
|---|---|---|---|
| 4,858,115 A * | 8/1989 | Rusterholz et al. ............... | 712/7 |
| 6,266,758 B1 | 7/2001 | van Hook et al. | |
| 2004/0054879 A1 | 3/2004 | Macy, Jr. et al. | |
| 2004/0133617 A1 | 7/2004 | Chen et al. | |
| 2006/0095712 A1 | 5/2006 | Selvaggi et al. | |

FOREIGN PATENT DOCUMENTS

| | | |
|---|---|---|
| EP | 1 873 627 | 1/2008 |
| GB | 2 400 065 | 6/2005 |
| GB | 2 409 065 | 6/2005 |

OTHER PUBLICATIONS

Search Report for Great Britain Application No. 0624774.6 dated Apr. 20, 2007.
Sonmez et al., "System-on-chip 2006, SIxD: A Configurable Application-Specific SISD/SIMD Microprocessor Soft-Core," 4 pages.

* cited by examiner

*Primary Examiner* — Tan V. Mai
(74) *Attorney, Agent, or Firm* — Nixon & Vanderhye P.C.

(57) ABSTRACT

An apparatus and method are provided for performing rearrangement operations and arithmetic operations on data. The data processing apparatus has processing circuitry for performing Single Instruction Multiple Data (SIMD) processing operations and scalar processing operations, a register bank for storing data and control circuitry responsive to program instructions to control the processing circuitry to perform data processing operations. The control circuitry is arranged to responsive to a combined rearrangement arithmetic instruction to control the processing circuitry to perform a rearrangement operation and at least one SIMD arithmetic operation on a plurality of data elements stored in the register bank. The rearrangement operation is configurable by a size parameter derived at least in part from the register bank. The size parameter provides an indication of a number of data elements forming a rearrangement element for the purposes of the rearrangement operation. The associated method involves controlling processing circuitry to perform a rearrangement operation and at least one SIMD arithmetic operation in response to a combined rearrangement arithmetic instruction and providing the scalar logic size parameter to configure the rearrangement operation. A computer program product is also provided comprising at least one combined rearrangement arithmetic instruction.

21 Claims, 14 Drawing Sheets

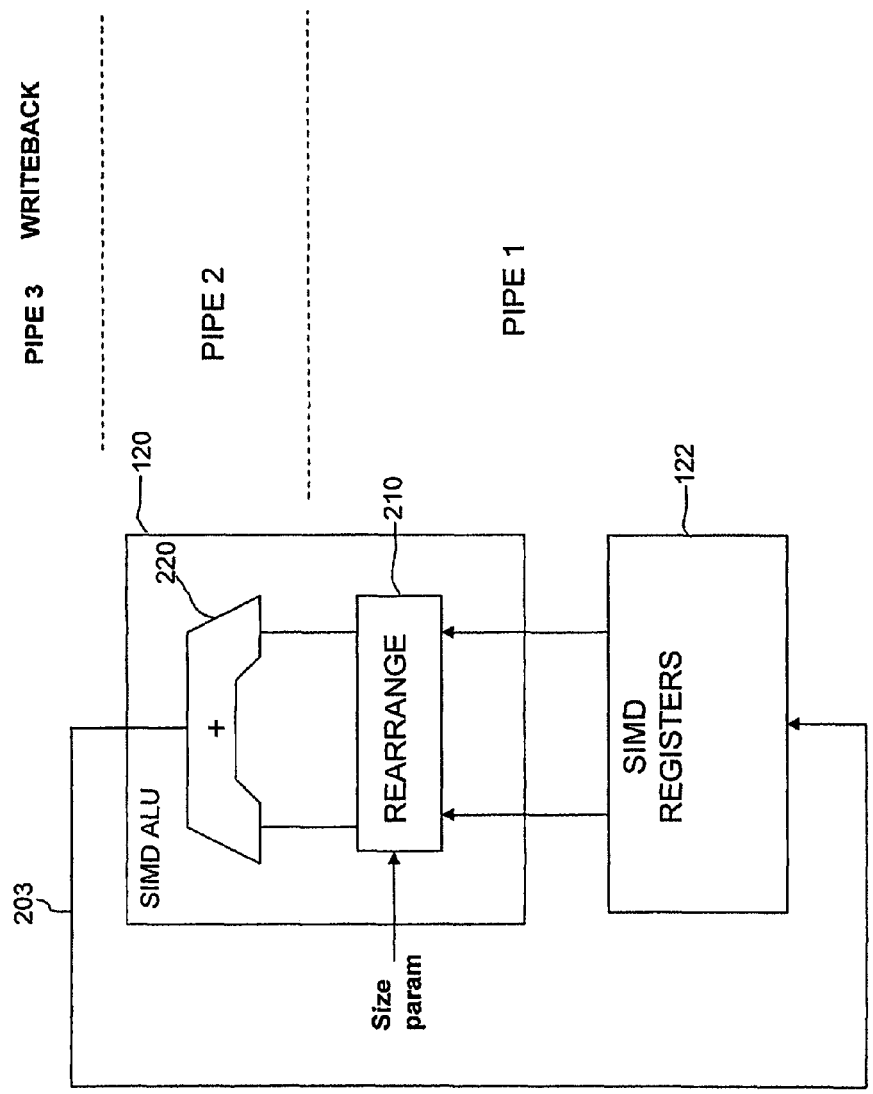

FIG 5

APPARATUS AND METHOD FOR PERFORMING REARRANGEMENT AND ARITHMETIC OPERATIONS ON DATA

TECHNICAL OVERVIEW

The technology relates to an apparatus and method for performing rearrangement operations and arithmetic operations on data.

BACKGROUND

Processing applications such as signal processing applications typically require a number of data manipulations to be performed in succession on blocks of data. Data communication algorithms for encoding and transforming data such as Fast Fourier Transform (FFT) algorithms, Viterbi algorithms and Turbo decoding algorithms implement basic butterfly operations in an iterative manner. Each butterfly operation involves rearrangement of a vector of data and subsequently requires one or more arithmetic operations to be performed on the rearranged data. It is known to perform such processing operations by providing rearrangement operations and providing forwarding logic for forwarding results of the rearrangement operations to circuitry for performing arithmetic operations. Although the circuitry for performing the rearrangement operations and the circuitry for performing the arithmetic operations may execute in parallel, in known systems the data dependency between the rearrangement operation and the arithmetic operation causes a bottleneck in processing, particularly for processors having limited forwarding logic or for deeply-pipelined processor cores. Indeed the data dependency between the operations can lead to stalling of the computation and loss of performance. Furthermore provision of data forwarding logic to reduce this problem is costly to implement.

Co-pending UK patent application number 0624774.6 filed on 12 Dec. 2006 describes an apparatus and method for performing rearrangement operations on data. In this system, Single Instruction Multiple Data (SIMD) processing logic is responsive to a rearrangement instruction to perform a selected rearrangement operation on a plurality of data elements in dependence upon a scalar parameter identifying a data element width for the data elements on which the selected rearrangement operation is performed.

SIMD is a technique for improving processing performance in applications involving highly repetitive operations. The SIMD technique allows the same operation (e.g. an arithmetic operation) to be performed substantially simultaneously on a plurality of data elements. The SIMD technique enables the number of iterations of a loop of a calculation to be reduced by incorporating multiple processing operations for each loop iteration. The SIMD technique typically uses "packed vectors", which are data structures containing a plurality of data elements. The SIMD packed vector may be used as an argument for a particular instruction so that the instruction is independently performed substantially simultaneously on all of the plurality of data elements of the packed vector.

Processors employing SIMD processing store data elements from the packed vectors in a special set of registers. The parallel processing is performed by logic units and makes use of this special set of registers. However, significant re-ordering of data will typically be required to create packed vectors from input data elements in order to make a calculation amenable to SIMD processing. The required re-ordering can have an adverse effect on the SIMD code density because several program instructions may be required to perform each re-ordering operation.

Thus, there is a need to provide a mechanism for more efficiently implementing processing operations in order to alleviate the bottleneck due to data dependencies between the rearrangement operations and the arithmetic operations and to improve the code density of algorithms within a SIMD processing system.

SUMMARY

A first aspect provides apparatus for processing data, said apparatus comprising:

processing circuitry for performing data processing operations comprising scalar processing circuitry for performing scalar operations and SIMD processing circuitry for performing SIMD operations;

a register bank having a plurality of registers for storing data;

control circuitry responsive to program instructions to control said processing circuitry to perform said data processing operations;

wherein said control circuitry is arranged to be responsive to a combined rearrangement arithmetic instruction to control said processing circuitry to perform a rearrangement operation and at least one SIMD arithmetic operation on a plurality of data elements corresponding to data stored in one or more registers of said register bank, said rearrangement operation being configurable by a size parameter derived at least in part from said register bank, said size parameter providing an indication of a number of data elements forming a rearrangement element for said rearrangement operation.

The inventors recognized that by providing a combined instruction for controlling processing circuitry to perform both a rearrangement operation and at least one SIMD arithmetic operation, many common data manipulations can be performed more efficiently than in known systems which provide separate rearrangement and arithmetic operations. Provision of the combined instruction enables the data dependency between the rearrangement operation and the arithmetic operation to be more efficiently dealt with by the processing circuitry. This obviates the need for costly data-forwarding logic and prevents bottlenecks in processing from occurring as a result of the requirement in known systems to forward operands from one operation to the next operation.

Provision of a single combined rearrangement arithmetic instruction improves processing performance, particularly for algorithms involving multiple repetitions of such combined instruction. The performance enhancement is achieved because only one (combined) instruction may to perform the same data manipulations that would otherwise require both a rearrangement instruction and an arithmetic instruction. The combined instruction allows for reduced power consumption relative to two separate instructions because it allows one instruction fetch operation, two register reads and two register writes to be eliminated. Provision of the single instruction allows for improved code density and avoids the need for costly data forwarding logic.

Implementations of commonly-used digital signal processing algorithms such as FFT, Viterbi decoding and Turbo decoding algorithms involve computations that require multiple repetitions of basic butterfly operations. Such butterfly operations involve, for example, rearranging data using a vector de-interleave (unzip operation) and performing arithmetic operations such as pair-wise additions and subtractions on the rearranged data. The combined instruction clearly enables such algorithms to be implemented more efficiently.

It will be appreciated that the control circuitry could respond to the combined rearrangement arithmetic instruction by performing the data manipulations in any order provided that all of the required operations are in fact performed at some stage and the result is mathematically correct. Accordingly, in one embodiment, the control circuitry is configured such that the rearrangement operation is performed prior to performing the at least one SIMD arithmetic operation. However, in an alternative embodiment, the control circuitry is configured such that the at least one SIMD arithmetic operation is performed prior to performing the rearrangement operation.

It will be appreciated that the SIMD arithmetic operation could comprise any one of a variety of different mathematical operations, as required by a particular processing application. However, in one embodiment, the at least one SIMD arithmetic operation comprises at least one of an addition, a subtraction, a maximum value determination, a minimum value determination and an add-compare-select operation. Such arithmetic operations are commonly performed in digital signal processing applications.

Although the rearrangement operation could comprise any type of data reordering, in one embodiment the rearrangement operation is one of an interleave operation (i.e. zip operation), a de-interleave operation (i.e. an unzip operation), a transpose operation, a duplicate operation and a reverse operation.

The size parameter could be read by the processing circuitry from a predetermined register or be provided by the scalar processing logic in some other way. However, in one embodiment, the size parameter is an input argument of the combined rearrangement arithmetic instruction. This enables the size parameter to be conveniently incremented in program applications that implement the combined instruction as part of the loop of calculations.

In one embodiment, the register bank comprises a scalar register bank for access by the scalar processing circuitry and a separate SIMD register bank for access by the SIMD processing circuitry and the data processing apparatus comprises transfer circuitry for transferring the size parameter from a storage location in the scalar register bank to the SIMD processing circuitry. Storage of the size parameter in the scalar register bank enables its calculation to be performed in advance so that it can be provided to the SIMD processing circuitry as and when required. In alternative arrangements the size parameter could be calculated on-the-fly for passing to the SIMD processing circuitry when required.

In one embodiment, the SIMD processing circuitry processes one or more operands comprising packed SIMD vectors, each packed SIMD vector comprising a plurality of data elements and the combined rearrangement arithmetic instruction takes a plurality of the packed SIMD vectors as input operands. Thus the rearrangement operation can span data elements corresponding to a plurality of SIMD vectors. Furthermore straight-forward arithmetic operations such as pair-wise addition and pair-wise subtraction operations can be performed using individual packed SIMD vectors as operands for the arithmetic operation.

It will be appreciated that the configurable nature of the rearrangement operation whereby the size parameter provides an indication of a number of data elements forming a rearrangement element means that the rearrangement element could comprise a single data element. However, in one embodiment the rearrangement vector comprises a plurality of rearrangement elements. This provides flexibility in configuring the rearrangement operation and is suitable for situations such as standard signal processing algorithms that typically involve zipping and unzipping contiguous blocks of data elements.

Although the two or more data elements forming the rearrangement element could comprise groups of non-adjacent data elements within a packed SIMD vector, in one embodiment the two or more data elements forming the rearrangement element comprises a group of data elements having adjacent positions in one of the packed SIMD vectors. This facilitates rearrangement operations comprising contiguous blocks of data which are common place in data processing techniques.

It will be appreciated that the processing circuitry could be responsive to the combined arithmetic rearrangement instruction to perform a rearrangement operation by rearranging data elements belonging to a single packed SIMD vector. However, in one embodiment, the processing circuitry is responsive to the combined arithmetic rearrangement instruction to perform the rearrangement operation across a number of data elements corresponding to two or more of said plurality of packed SIMD vectors. This provides the flexibility to perform a wider range of data manipulations using a single instruction.

In one embodiment, the rearrangement operation across a plurality of packed SIMD vectors involves rearranging results of at least two different SIMD arithmetic operations. Thus, for example, a packed SIMD vector comprising results of a SIMD add operation can be concatenated with a packed SIMD vector corresponding to results of SIMD subtract operation and then the rearrangement operation may be performed across the concatenated input vectors. This allows relatively complex data manipulations that would otherwise be performed using a plurality of instructions to be efficiently performed using a single instruction.

It will be appreciated that the combined rearrangement arithmetic instruction could be utilized in any program code. However, in one embodiment the combined rearrangement arithmetic instruction is provided within a loop of program instructions and the scalar processing circuitry is arranged to calculate an updated value of the size parameter for supply to the SIMD processing circuitry for successive iterations of the loop. Iterative loops of processing instructions are commonplace in vector implementations of data processing algorithms such as coding algorithms and algorithms involving data transforms. Proving the combined rearrangement arithmetic instruction within the loop of program instructions and supplying the appropriate size parameter allows for more efficient implementation of algorithms in which both a rearrangement operation and an arithmetic operation are performed on each iteration of a loop and where the rearrangement operation changes between successive iterations. For algorithms such as a Fast Fourier Transform, this enables the same loop of program code to be used to perform each stage of the FFT process where otherwise different program code would have to be provided for different iterations. Thus an improved code density can be achieved.

In some embodiments in which the combined rearrangement arithmetic construction is provided within a loop of program instructions, the loop comprises part of one of a Viterbi decoding algorithm, a Fast Fourier Transform algorithm and a Turbo decoding algorithm. Such algorithms typically involve multiple iterations of loops that involve both data rearrangements and arithmetic with a data dependency between the data manipulations.

Although the scalar processing circuitry and the SIMD processing circuitry could operate in parallel independently such that they independently schedule and execute processing operations without any synchronization, in one embodiment the scalar processing circuitry and the SIMD processing circuitry are synchronized such that the scalar processing circuitry operates in parallel with SIMD processing circuitry to supply an updated value of the size parameter to the SIMD processing circuitry for each successive iteration of the loop. This obviates the need to store values of the size parameter in the registers yet ensure that the size parameter is provided to the SIMD processing circuitry as and when required without causing stalling of the processing and consequential loss of performance.

The data processing apparatus could be any type of data processing apparatus, for example, an integrated circuit. However, in one embodiment the data processing apparatus is digital signal processor and in another embodiment the data processing apparatus is a co-processor.

A second aspect provides a method of performing combined rearrangement operations and SIMD operations using a data processing apparatus having register bank having a plurality of registers for storing data, processing circuitry for performing data processing operations and control circuitry for controlling the processing circuitry, said processing circuitry comprising scalar processing circuitry for performing scalar operations and SIMD processing circuitry for performing SIMD operations, said method comprising the steps of:

in response to a combined rearrangement arithmetic instruction, controlling said processing circuitry to perform a rearrangement operation and at least one SIMD arithmetic operation on a plurality of data elements stored in said register bank;

providing from said scalar processing logic a size parameter derived at least in part from said register bank, said size parameter providing an indication of a number of data elements forming a rearrangement element for said rearrangement operation and configuring said rearrangement operation using said size parameter.

A third aspect provides a computer program product comprising a computer program for controlling a computer to perform the method of the second aspect of the present invention, the computer program comprising at least one combined rearrangement arithmetic instruction.

A fourth aspect provides a virtual machine providing an emulation of an apparatus for processing data, said apparatus comprising:

processing circuitry for performing data processing operations comprising scalar processing circuitry for performing scalar operations and SIMD processing circuitry for performing SIMD operations;

a register bank having a plurality of registers for storing data;

control circuitry responsive to program instructions to control said processing circuitry to perform said data processing operations;

wherein said control circuitry is arranged to be responsive to a combined rearrangement arithmetic instruction to control said processing circuitry to perform a rearrangement operation and at least one SIMD arithmetic operation on a plurality of data elements corresponding to data stored in one or more registers of said register bank, said rearrangement operation being configurable by a size parameter derived at least in part from said register bank, said size parameter providing an indication of a number of data elements forming a rearrangement element for said rearrangement operation.

The above, and other objects, features and advantages will be apparent from the following detailed description of illustrative embodiments which is to be read in connection with the accompanying drawings.

BRIEF DESCRIPTION OF THE DRAWINGS

FIG. 2 schematically illustrates a portion of the circuitry of the SIMD ALU of the data engine of FIG. 1 in more detail;

FIG. 5 schematically illustrates a combined rearrangement arithmetic instruction in which the arithmetic operation is performed first and then the rearrangement operation is performed;

DESCRIPTION OF NON-LIMITING, EXAMPLE EMBODIMENTS

Figure 1:
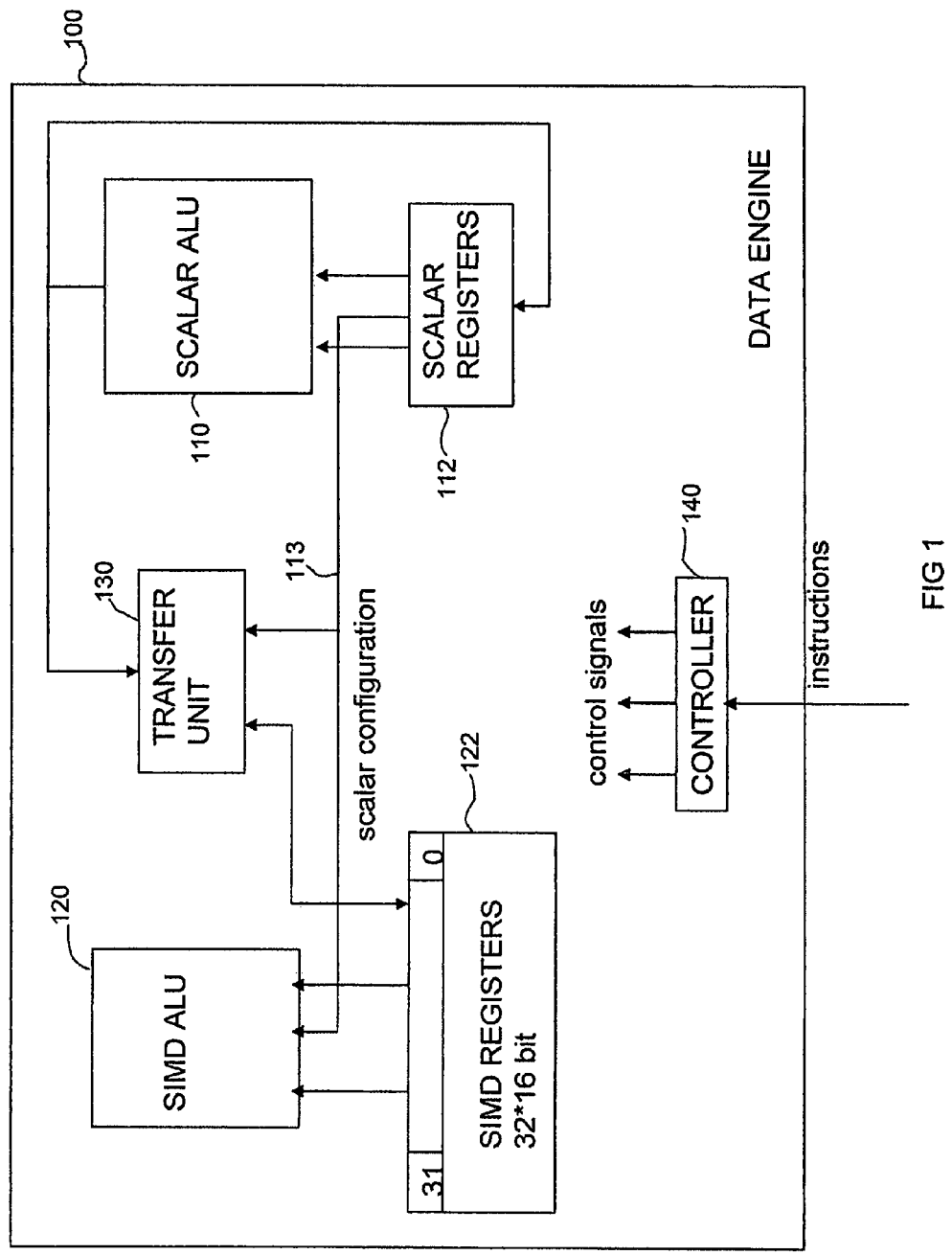
FIG. 1 schematically illustrates a data engine.

FIG. 1 schematically illustrates an example data engine. The data engine 100 comprises: a scalar ALU 110 and associated scalar registers 112; a SIMD ALU 120 and associated SIMD registers 122; a transfer unit 130; and a controller 140.

The data engine in this example comprises an integrated circuit. The scalar ALU 110 is arranged to perform data processing operations on scalar operands to generate scalar results. The scalar registers 112 comprise fifteen 32-bit registers. The scalar ALU 110 performs manipulations (e.g. additions, multiplications and shifts) on data elements read from the scalar registers 112. The controller 140 is responsive to receipt of scalar instructions to produce control signals, which control the circuitry of the scalar ALU 110 to perform data manipulations specified by the scalar instructions.

Results of the data manipulation specified by the instructions are stored in the scalar registers 112.

In particular, the scalar ALU 110 is operable to calculate the value of a size parameter which specifies a number of data elements forming a rearrangement unit (which remains intact) for the rearrangement operation on a SIMD input vector. The scalar ALU 110 outputs the size parameter to the SIMD ALU 120 via a data path 113. The transfer unit 130 enables seamless transfer of data between the scalar ALU 110 and the SIMD ALU 120.

The SIMD ALU 120 performs SIMD operations on SIMD input vectors, each comprising a plurality of data elements. Similarly to the scalar ALU 110, the SIMD ALU 120 performs data manipulations in dependence upon SIMD instructions received via the controller 140. The SIMD registers 122 comprise 15 registers each holding 32*16-bit values but the size and number of SIMD registers is implementation-dependent and may well differ from the register size illustrated. The SIMD ALU 120 is arranged to perform the same operation, be it arithmetic or otherwise, on the plurality of data elements of the packed SIMD input vector(s) simultaneously. The SIMD ALU 120 does this by performing a given operation independently on each of the plurality of data elements of a SIMD input vector.

Individual data elements (in this case 16-bit data elements) are considered to be packed into the SIMD vector. In this particular arrangement, each SIMD vector comprises thirty-two 16-bit data elements. A SIMD "packed vector" can be used as an argument for a given instruction such as an arithmetic operation and the given operation will be performed independently on each data element in the SIMD vector substantially simultaneously. The number of data elements that can be packed into a SIMD vector affects the performance of the data processing system because the larger the number of data elements that are packed into the data vector greater the number of processing operations that are substantially simultaneously performed.

The SIMD registers 122 are used to store input vectors for SIMD operations currently being performed by the SIMD ALU 120. SIMD results vectors are also stored in the SIMD registers 122. A given SIMD instruction will typically perform a data manipulation on one or more SIMD input vectors to generate a SIMD output vector although the manipulation may be dependent upon one or more scalar parameters from the scalar registers 112, the value of the parameter being calculated by the scalar ALU 110. The transfer unit 130 can be used to ensure that scalar parameters provided by the scalar processing logic 110 are supplied as input to the SIMD processing logic 120, 122 in a form that is recognized by the SIMD processing logic. However, in this embodiment, the one or more scalar parameters on which the data manipulation depends is read directly from the scalar register bank via the path 113 and does not go via the transfer unit.

FIG. 2 schematically illustrates a portion of the circuitry of the SIMD ALU 120 of the data engine of FIG. 1 in more detail. In particular, FIG. 2 schematically illustrates a portion of the SIMD ALU circuitry configured to perform data manipulations associated with the combined rearrangement arithmetic instruction according to the present technique. The circuitry of FIG. 2 comprises an unzip module 210 and a SIMD add unit 220, which are part of the SIMD ALU 120 of FIG. 1. The SIMD registers 122 of FIG. 1 are also shown. The combined rearrangement arithmetic instruction is performed as a pipelined operation.

At the first stage of the pipeline (PIPE 1) two 32 element SIMD input vectors are loaded into the SIMD registers 122 (see FIG. 1). These two SIMD input vectors are manipulated by the unzip circuit 210 in dependence upon a size parameter provided by the scalar processing circuitry. The size parameter specifies how many of the 16-bit data elements of the SIMD vector are to be grouped together as a rearrangement unit for the purpose of the unzip operation. For example, if the size parameter is two, then the re-ordering of data elements will be performed pair-wise such that adjacent data elements are paired and are kept together as a single entity throughout the rearrangement. The result of the unzip operation performed by the unzip circuitry 210 is two 32-element SIMD vector result vectors of the same sizes as the two SIMD input vectors. However, the output of the unzip module 210 is only an intermediate result.

The output of the unzip module 210 is supplied as input to the SIMD adder unit 220 which performs independent add operations using individual data elements of the two SIMD vectors as input operands. The add operations performed by the adder unit 220 correspond to the second pipeline stage (PIPE 2). Note that in this arrangement, the SIMD adder unit 220 operates on individual data elements rather than the groups of data elements that form the rearrangement unit.

The third pipeline stage (PIPE 3) is a writeback stage whereupon results of the combined unzip and add operation are written into the SIMD registers 122 via path 203.

Figure 3A:
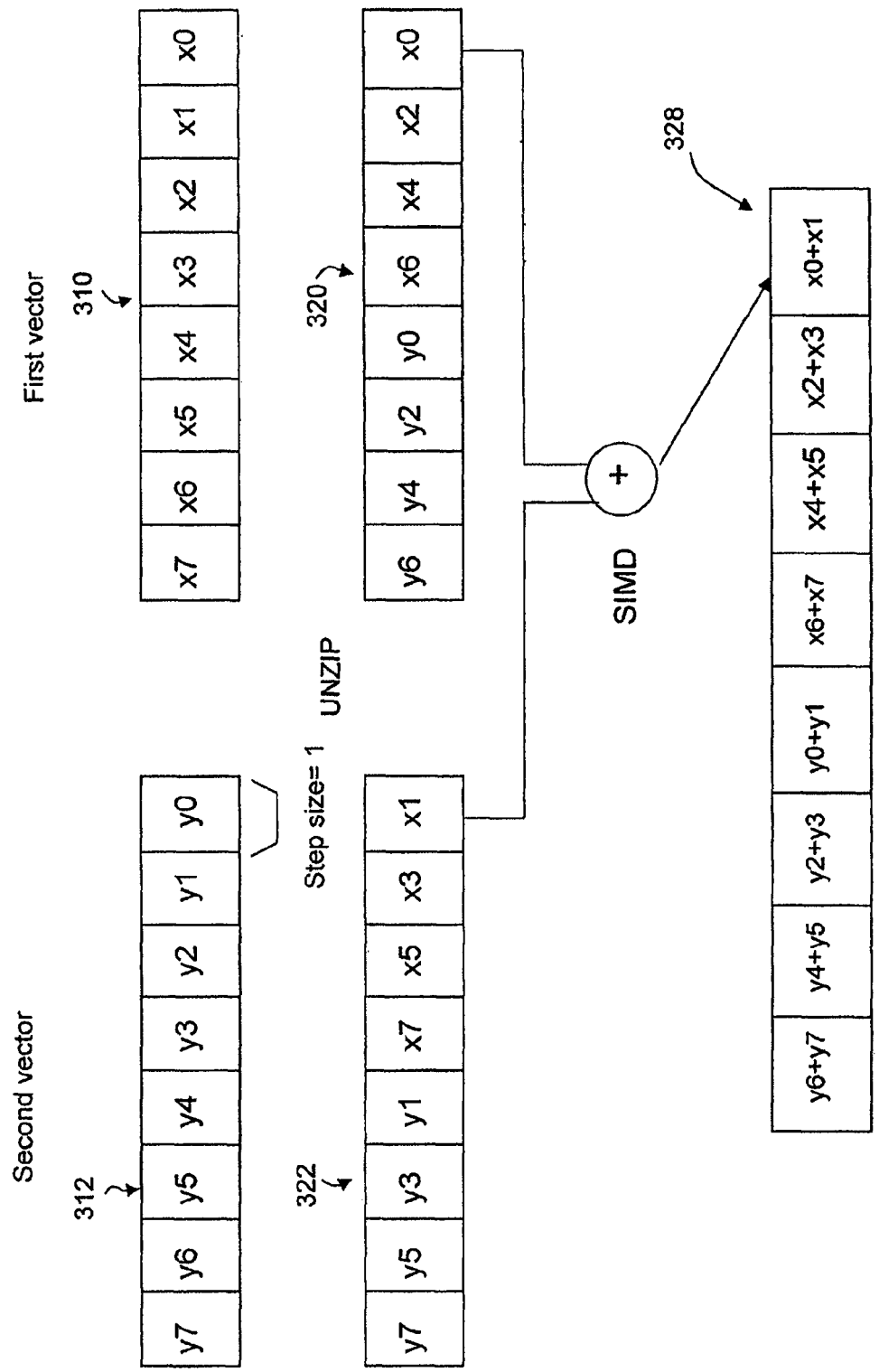
FIGS. 3A, 3B and 3C schematically illustrate different examples of combined rearrangement arithmetic instructions where the rearrangement operation corresponds to an unzip operation and the arithmetic operation corresponds to a SIMD add operation.
Figure 3B:
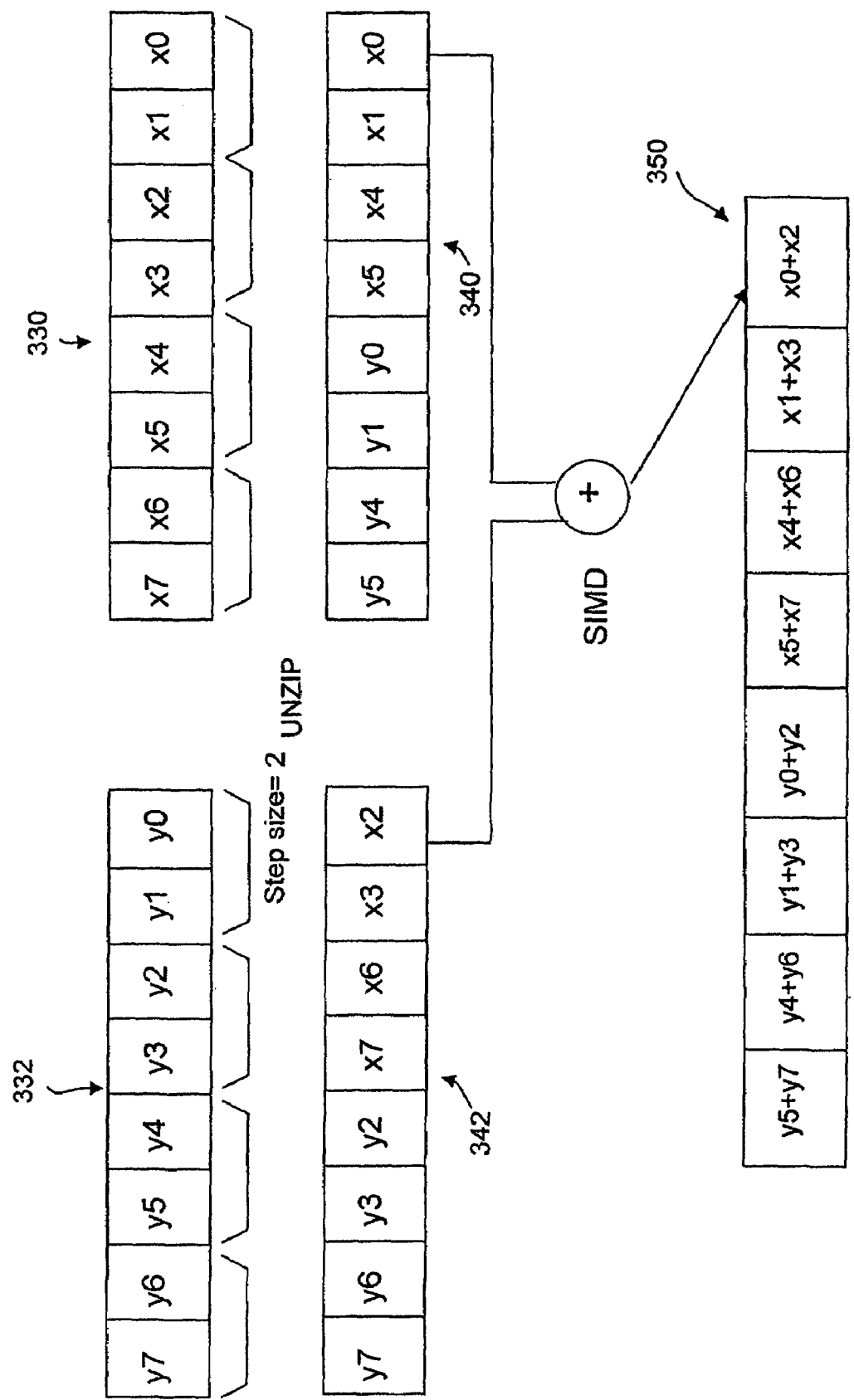
Figure 3C:
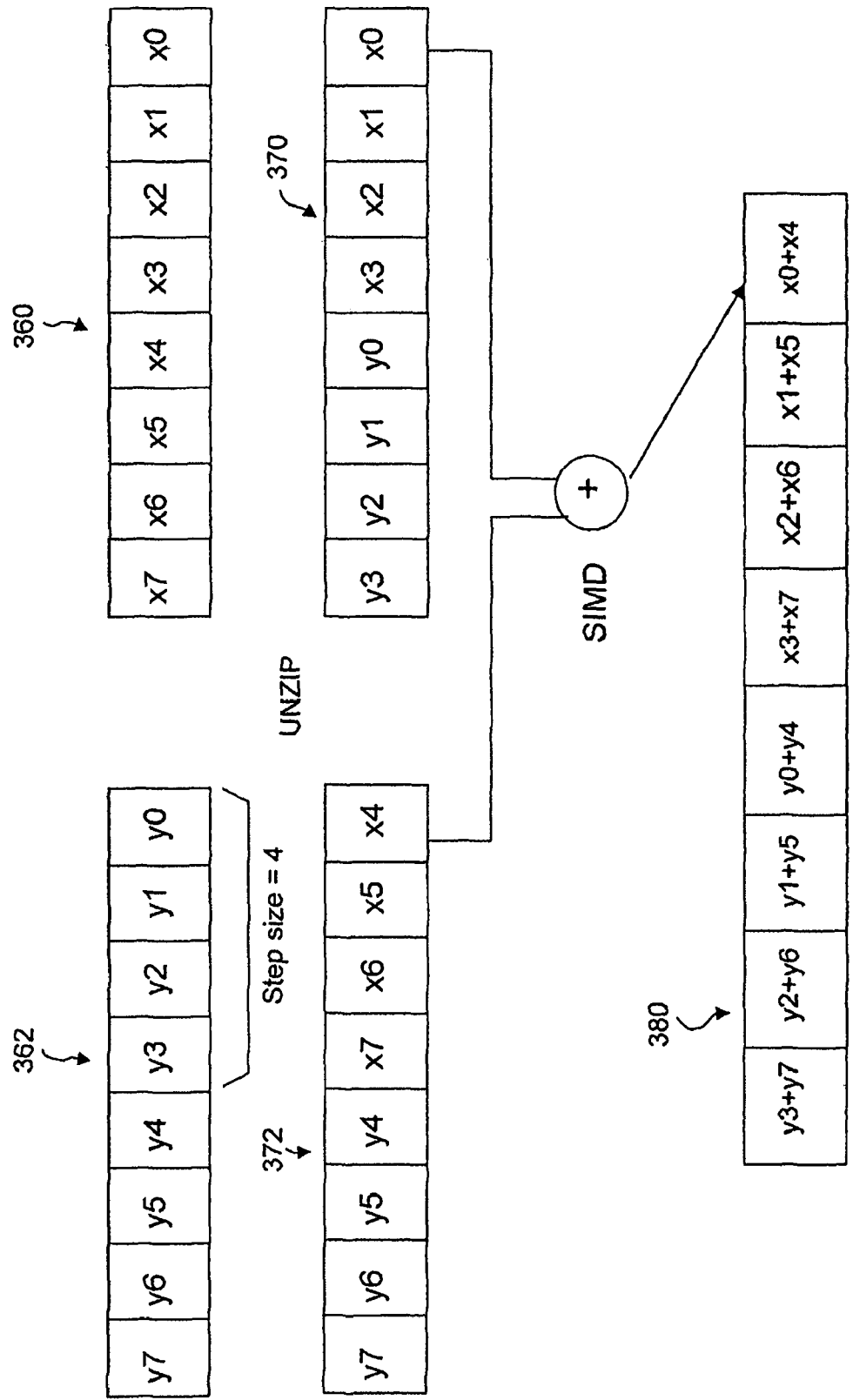

FIGS. 3A, 3B and 3C schematically illustrate example combined rearrangement arithmetic instructions where the rearrangement operation corresponds to an unzip operation (i.e. de-interleave) and the arithmetic operation corresponds to a SIMD add operation. For clarity, in these examples each SIMD vector comprises eight rather than 32 data-elements. The examples of FIGS. 3A to 3C differ in that the size parameter is different in each case. The size parameter is specified by the value jj and jj=$\log_2$ (step size), where the step size is the number of data elements per rearrangement unit. It follows that step size=$2^{jj}$.

In the example instruction of FIG. 3A, jj=0 so the step size=$2^0$=1, which means that the rearrangement unit is an individual data element and each of the two input vectors has eight data elements. A first input vector 310 and a second input vector 312 each comprises eight 16-bit data elements. The unzip operation (performed by the unzip circuit 210 of FIG. 2) performs a rearrangement that spans all sixteen data elements of the two input vectors 310, 312. Accordingly, following the unzip operation, a first intermediate result vector 320 and a second intermediate result vector 322 each comprise a mixture of data elements from the first and second input vectors 310 and 312. After the rearrangement operation has been performed, individual data elements of the first intermediate result vector 320 are added to corresponding data elements of the second intermediate result vector 322 as shown to produce the SIMD output vector 328 having eight data-elements representing the eight independent additions. In particular, the first data element x0 of intermediate result vector 320 is added to the first data element x1 of the intermediate result vector 322 to form the result (x0+x1) and the second data element x2 of the intermediate result vector 320 is added to the second data element x3 of the second intermediate result vector 322 to generate the output data element x2+x3 and so on.

FIG. 3B schematically illustrates a combined unzip SIMD add operation for a scalar parameter value jj=1 corresponding to a step size=$2^1$=2. Accordingly, in this case, each rearrangement unit comprises two data elements. Thus, for example, one rearrangement unit comprises adjacent data elements x0 and x1 and these two data elements remain adjacent in the rearranged intermediate result vector 340. Note that the two eight data-element SIMD input vectors 330, 332 are identical to the input vectors 310, 312 of FIG. 3A, but the intermediate result vectors 340, 342 differ from the intermediate result vectors 320, 322 of FIG. 3A because of the difference in the step size. The step-size of two means each of the rearrangement units {x0, x1}, {x2, x3}. {x4, x5}, {x6, x7}, {y0, y1}, {y2, y3}. {y4, y5}, {y6, y7} remains intact in the intermediate result vectors 340, 342. As for the example of FIG. 3A, the SIMD add operation is performed on individual data elements such that eight pair-wise additions are performed on respective data elements of the first intermediate result vector 340 and the second intermediate result vector 342. Thus, in this example embodiment, the size parameter has no effect on the SIMD add operation.

FIG. 3C corresponds to a combined unzip SIMD add operation where the size parameter jj=2 corresponding to a step size=$2^2$=4. Accordingly, in this case each rearrangement unit comprises four data elements. In particular, the rearrangement units are {x0, x1, x2, x3}, {x4, x5, x6, x7}, {y0, y1, y2, y3}, {y4, y5, y6, y7} and the intermediate result vectors 370 and 372 each comprise four consecutive data elements from the first input vector 360 and another four consecutive data elements from the second input vector 362. Similarly to FIGS. 3A and 3B, the SIMD add operation in FIG. 3C involves performing eight independent additions, one for each of the eight data-elements of intermediate result vectors 370 and 372.

It is instructive to compare and contrast the result vectors 330, 350 and 380 from FIGS. 3A, 3B and 3C. The result vectors are different, despite the input vectors being identical and the operations all being combined unzip add operations, due to the fact that the size parameter is different in each case.

Figure 4:
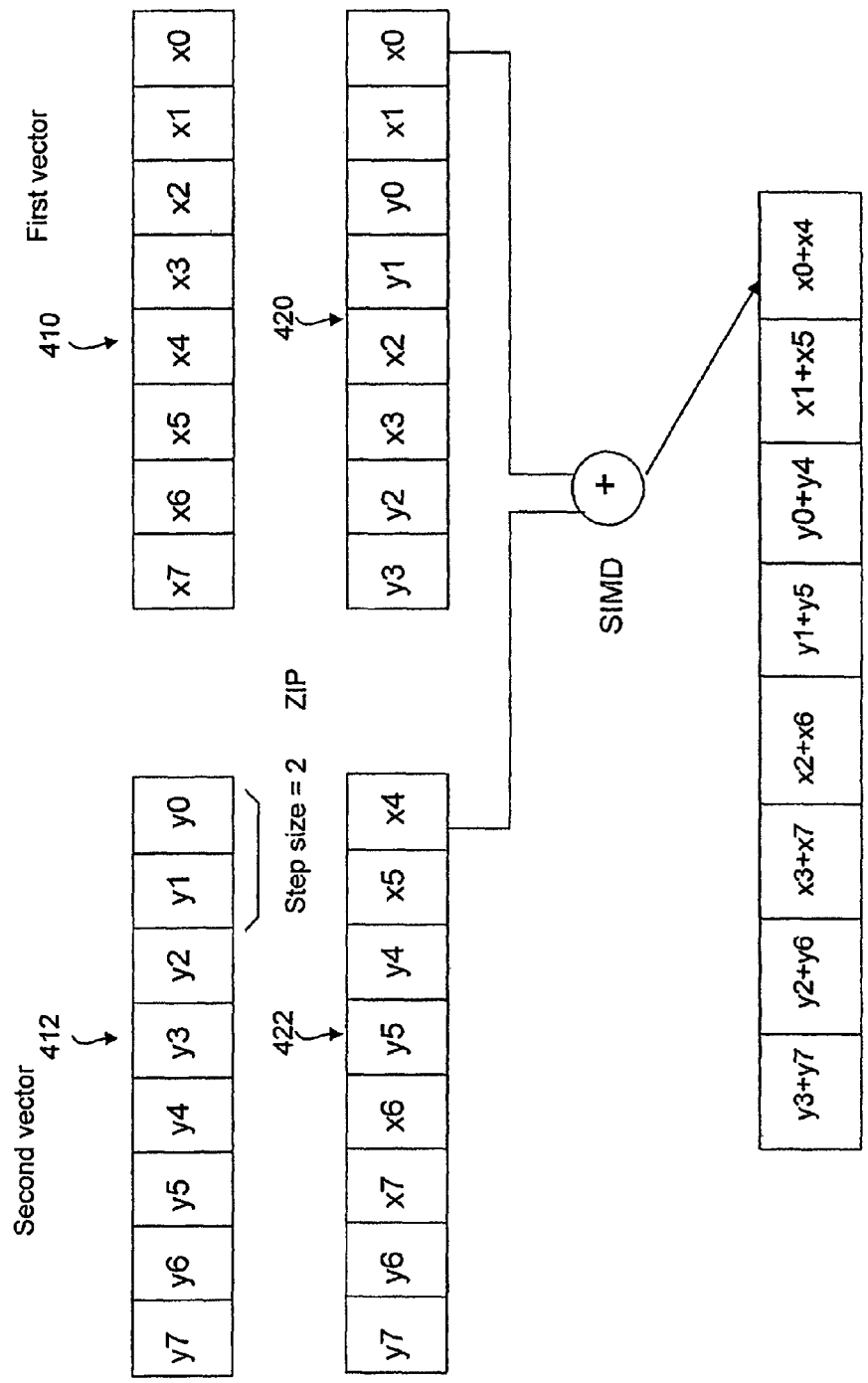
FIG. 4 schematically illustrates a combined rearrangement arithmetic instruction where the rearrangement operation comprises a zip operation and the arithmetic operation corresponds to a SIMD add operation.

FIG. 4 schematically illustrates a combined rearrangement arithmetic instruction in which the rearrangement operation comprises a zip operation (instead of the unzip operation illustrated by FIGS. 3A, 3B, 3C). For the zip operation (i.e. interleave) of FIG. 4 is jj=1 (similarly to FIG. 3B) corresponding to a step size=2. The zip operation spans a first input data vector 410 and a second input data vector 412. Comparison of intermediate result vectors 340, 342 for the unzip operation (with step size=2) of FIG. 3B and intermediate result vectors 420, 422 for the zip operation (with step size=2) illustrates the difference in the rearrangement resulting from the zip relative to the unzip. In the example of FIG. 4, following the zip operation eight independent pair-wise additions are performed using the two eight-element intermediate results vectors 420, 422 as operands.

Figure 5:
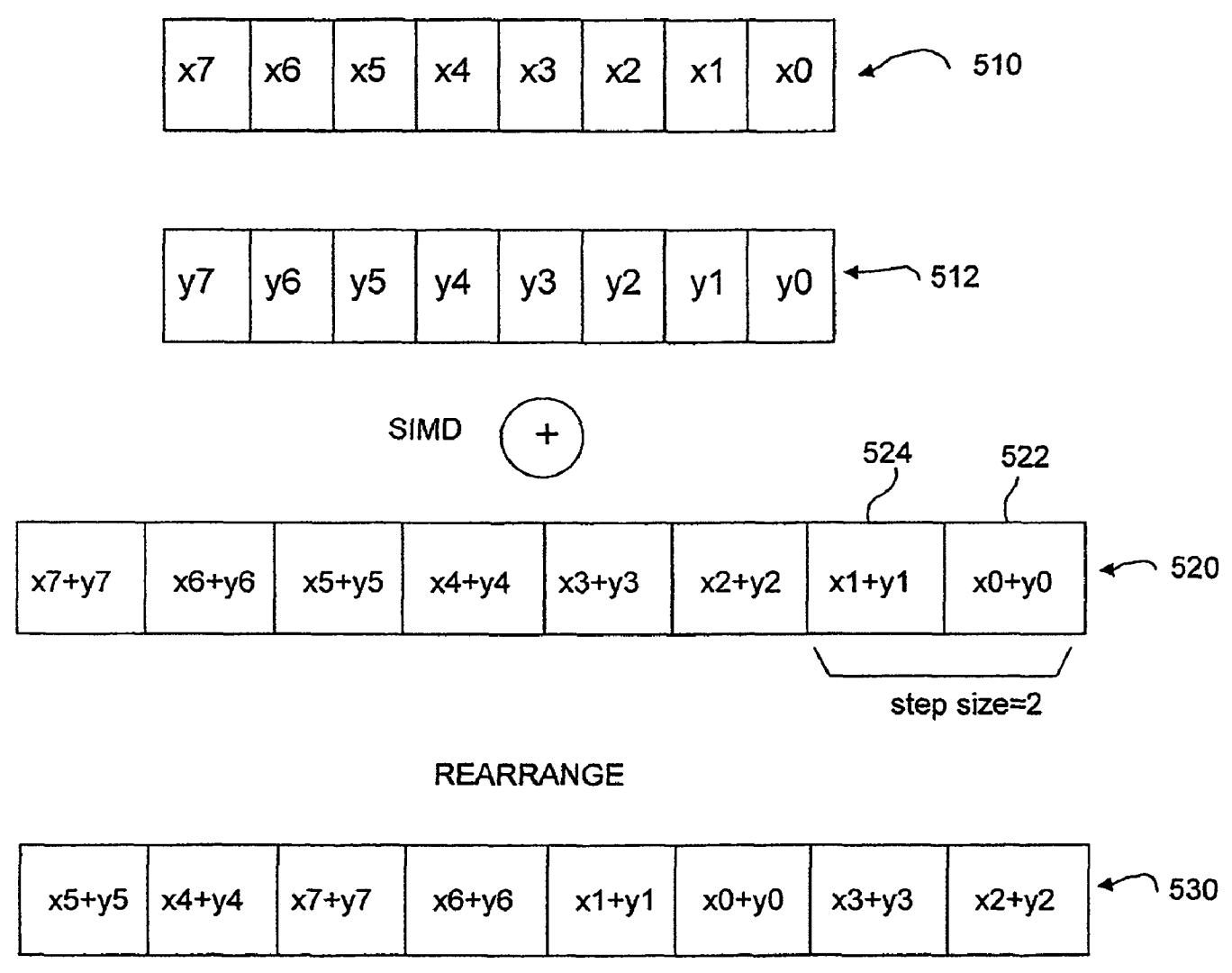

FIG. 5 schematically illustrates an alternative implementation of the combined rearrangement arithmetic instruction in which the arithmetic operation is performed prior to the rearrangement operation (compare with FIGS. 3A-3C and FIG. 4 where the rearrangement is performed first).

The first stage of the calculation in FIG. 5 involves eight independent additions corresponding to the eight data elements of each of a pair of input vectors 510, 512. The intermediate result vector 520 contains the results of the SIMD addition. Thus a first data element 522 of the intermediate result vector 520 comprises a result of the addition x0+y0, the second data element 524 comprises a result of the addition x1+y1 and so on. Again, the step size=2(jj=1) has no bearing on the SIMD addition, but does influence the rearrangement. The rearrangement units {x0+y0, x1+y1}, {x2+y2, x3+y3}, (x4+y4, x5+y5}, {x6+y6, x7+y7} of the intermediate results vector 520 are rearranged to generate the final result vector 530.

In order to implement the combined rearrangement arithmetic instruction of FIG. 5, the circuitry of FIG. 2 is adapted such that the add circuit corresponds to the second pipeline stage (PIPE 2) and the rearrangement circuit 210 corresponds to the third stage of the pipeline (PIPE 3).

In the above examples the rearrangement operations comprise either unzip operations or zip operations. However, it will be appreciated that these are only two of a plurality of possible example rearrangement operations that can be performed according to the present technique. In other embodiments the rearrangement operation comprises at least one of: a zip operation, an unzip operation, a transpose operation, a duplication operation and a reversal operation.

Figure 6:
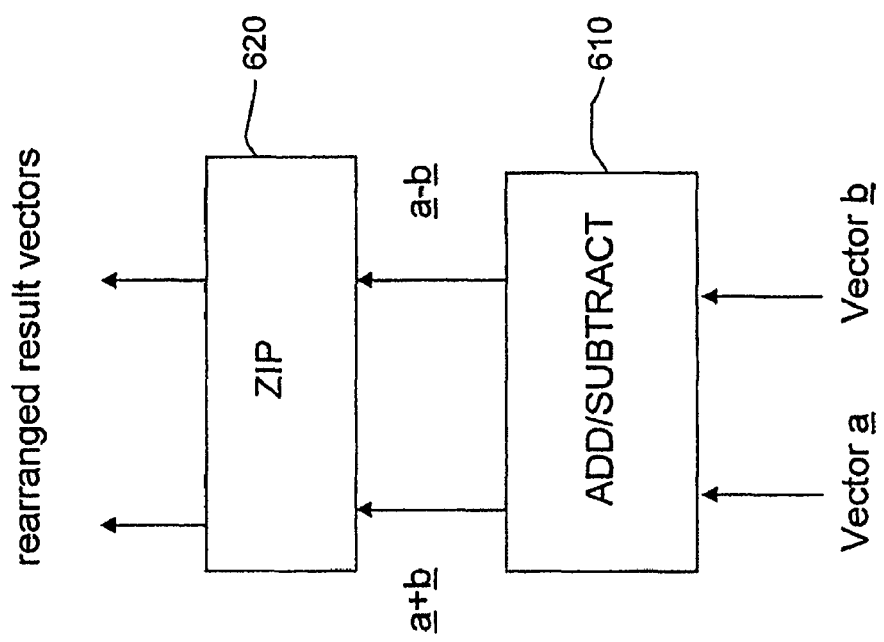
FIG. 6 schematically illustrates an example of a combined rearrangement arithmetic operation in which the rearrangement operation is performed on the concatenated results of two different arithmetic operations.

FIG. 6 schematically illustrates ALU circuitry for performing a combined rearrangement arithmetic operation involving two different arithmetic operations and in which the arithmetic operations are performed prior to the rearrangement operation (similarly to FIG. 5). The circuitry comprises add/subtract circuitry 610 and zip circuitry 620 (which form part of the SIMD ALU 120 of FIG. 1).

In this case, a first input vector a and a second input vector b each comprise sixteen 16-bit data-elements. The add/subtract circuit 610 operates on the input vectors a, b to perform both an addition and a subtraction, which generates two sixteen data-element intermediate result vectors (a+b) and (a−b) respectively. These two intermediate result vectors are supplied as input to the zip circuit 620, which performs a rearrangement operation corresponding to a zip operation in dependence upon a scalar size parameter. The zip circuit 620 outputs two sixteen data-element result vectors in which the data elements of the two intermediate result vectors have been rearranged. In this example, a single combined instruction can be used to perform (i) the addition operation to generate a+b; (ii) the subtraction operation to generate a−b; and (iii) the zip operation, which acts on both intermediate result vectors.

Figure 7:
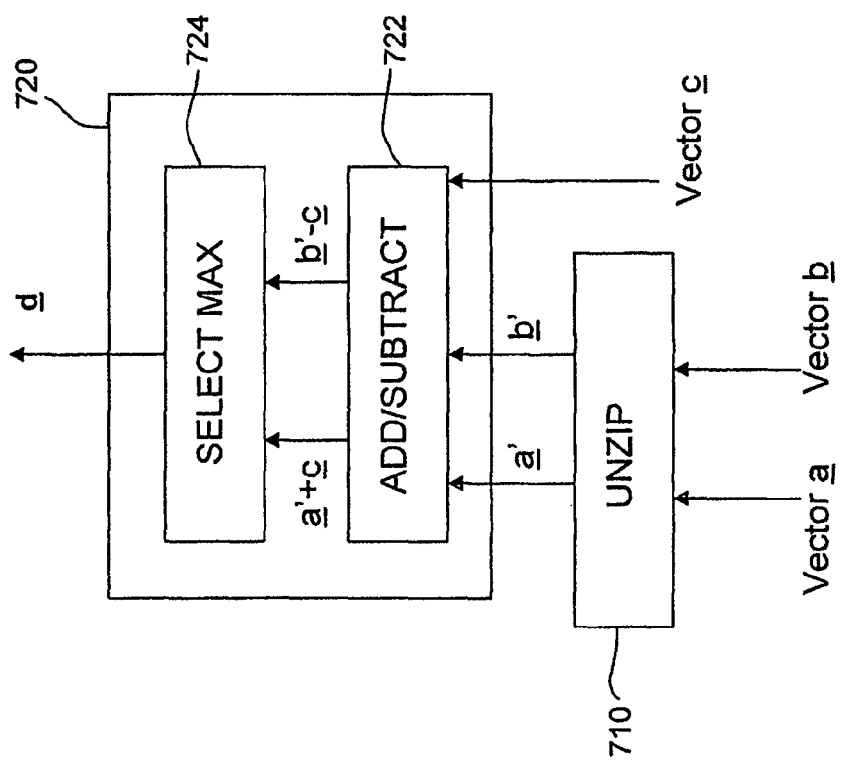
FIG. 7 schematically illustrates circuitry providing within the SIMD ALU of the data engine FIG. 1, which is used to perform an add/compare select operation in combination with a rearrangement operation.

FIG. 7 schematically illustrates circuitry for performing an add/compare select operation in combination with a rearrangement operation. This circuitry is provided within the SIMD ALU 120 of FIG. 1. A circuitry comprises an unzip circuit 710 and add/compare select circuitry 720. The add/compare select circuitry 720 comprises add/subtract circuitry 722 and maximum value selection circuitry 724. The particular combined rearrangement arithmetic operation performed by the circuit of FIG. 7 takes the three vectors a, b, and c as input operands.

The unzip circuit 710 performs a rearrangement operation involving the input vectors a and b and outputs rearranged vectors a' and b', which are supplied as input to the add/subtract circuit 722. The input vector c is supplied directly to the add/subtract circuit 722. Individual data-elements of the vector c are added to corresponding data-elements of a' to generate a vector (a'+c) and subtracted from corresponding data-elements of b' to generate a vector (b'−c). These two intermediate result vectors (a'+c) and (b'−c) are supplied to the maximum value selection circuit 724, which selects whichever of the two intermediate input vectors (a'+c) and (b'−c) is the greatest in magnitude to generate the output result vector d.

The combined rearrangement arithmetic instruction according to the present technique has particular applications in vector implementations of algorithms such as Fast Fourier Transform, Viterbi decoding and Turbo decoding algorithms used in signal processing applications. Such algorithms typically involve so-called "butterfly operations" which involves both rearrangements of input data via a vector deinterleave (i.e. unzip operation) and performing arithmetic operations on the rearranged data.

Figure 8:
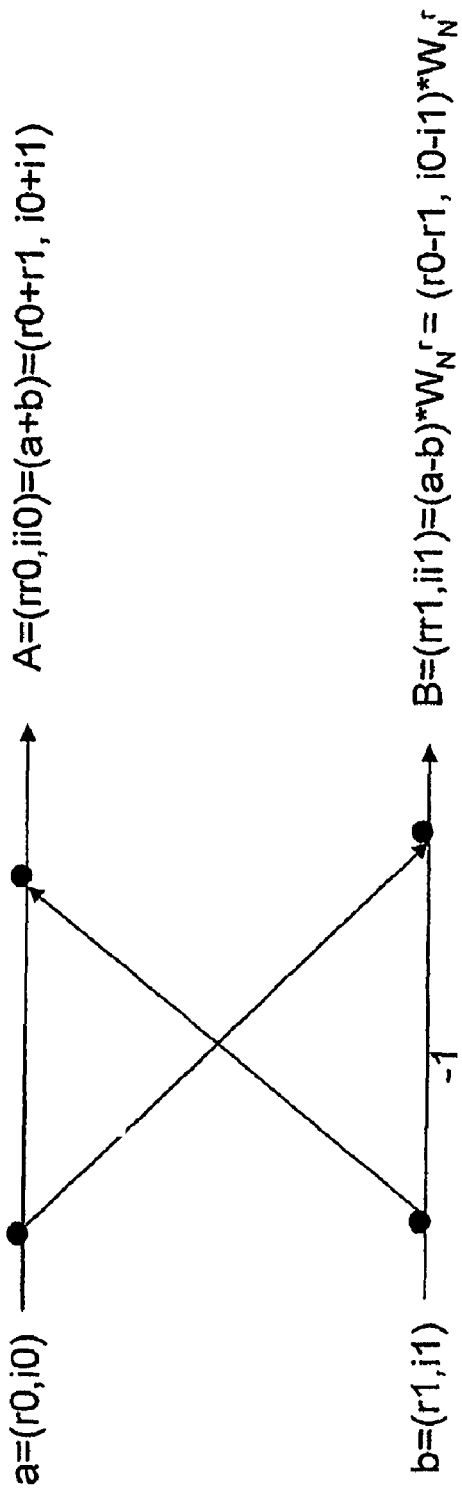
FIG. 8 schematically illustrates a butterfly diagram as employed in a Fast Fourier Transform decimation-in-frequency algorithm.

FIG. 8 schematically illustrates a butterfly diagram corresponding to one such butterfly operation. The name "butterfly" comes from the shape of the data-flow diagram. As shown in FIG. 8, the data-flow diagram shows mappings between the inputs a and b on the left of the diagram and the outputs A and B on the right of the diagram. The inputs a and b each comprise a complex number having a real part r* and an imaginary part i*, (where *=0 or 1). Thus input a has a real part r0 and an imaginary part i0 and input b has a real part r1 and an imaginary part i1. In this particular example, the output A corresponds to the result of adding the two inputs a and b whilst the output B corresponds to subtracting the input b from the input a. The subtraction is indicated by a "−1" on the bottom horizontal line of the butterfly diagram. The inputs a and b are complex numbers so it follows that generating the output A involves a complex addition whereas generating output B involves a complex subtraction.

Consider the particular example of the Fast Fourier Transform algorithm and an implementation corresponding to a "radix 2" implementation. A Fourier transform is a well-known mathematical operation that decomposes a signal into a continuous spectrum of its frequency components. An inverse Fourier transform synthesizes a signal from its spectrum of frequency components.

A discrete Fourier transform is a Fourier transform corresponding to discrete time signals and is widely employed in signal processing applications to analyze frequencies contained in a sample signal, to solve partial differential equations and to perform other operations such as convolutions. The Fast Fourier Transform (FFT) algorithm is used to compute a discrete Fourier transform.

The discrete Fourier Transform can be described by the following equation:

$$X(k) = \sum_{n=0}^{N-1} x(n) W_N^{kn} \; 0 \leq k \leq N-1$$

The transform computation involves calculating the sequence X(k) of complex numbers given N input data values corresponding to the sequence x(n) (usually also assumed to be complex valued) and where $W_N = e^{-j2\pi/N}$ (twiddle factors).

$$X(k) = \sum_{n=0}^{(N/2)-1} \left[ x(n) + (-1)^k x\left(n + \frac{N}{2}\right) \right] W_N^{kn}$$

Splitting X(k) into even-numbered and odd-numbered samples (process called decimation) gives $$X(2k) = \sum_{n=0}^{(N/2)-1} \left[ x(n) + x\left(n + \frac{N}{2}\right) \right] W_N^{2kn}, k = 0, 1, 2 \ldots , \frac{N}{2} - 1$$

even samples $$X(2k+1) = \sum_{n=0}^{(N/2)-1} \left[ x(n) - x\left(n + \frac{N}{2}\right) \right] W_N^{2kn} W_N^n, k = 0, 1, 2 \ldots , \frac{N}{2} - 1$$

odd samples

These equations form the decimation-in-frequency FFT algorithm for calculating the discrete Fourier transform. Computation of this N-point DFT via the decimation-in-frequency FFT requires $N \log_2 N$ complex additions and $(N/2) \log_2 N$ complex multiplications.

To directly evaluate the sums involved in the discrete Fourier transform equations would take the order to $N^2$ mathematical operations for a total of N data samples, but the FFT algorithm allows the same result to be computed in only the order of N Log N operations. This simplification is achieved by recursively breaking down a discrete Fourier transform of any composite size $N=N_1.N_2$ into a plurality of smaller DFTs of sizes $N_1$ and $N_2$ and the order of N multiplications by complex roots of unity known as "twiddle factors". The radix-2 FFT algorithm divides the discrete Fourier transform into two pieces of size N/2 at each step. In the butterfly diagram of FIG. 8, the complex numbers a and b correspond to two inputs and the outputs A and B correspond to outputs of two sub-transforms.

The FFT algorithm can be performed using either decimation in time or decimation in frequency. The particular example of FIG. 8 corresponds to decimation in frequency and in this case the output vector B (corresponding to a complex subtraction of a−b) is multiplied by a twiddle factor $W_N^r$. The following excerpt of code is program code in which a combined rearrangement arithmetic instruction according to the present technique is employed to calculate a Fast Fourier Transform in a radix 2 implementation. This excerpt of program code performs calculation of FFT butterflies and multiplying by twiddle factors.

```
// we have already loaded the twiddle factors we need
    jj=LTOuter;
FFT_LT_OUTER:
    for (j=LTOuter;j>0;j--)
    {
        vRDTmp= vuzp_m_s16 (t_r0, t_r0, 0);
        vIDTmp = vuzp_m_s16 (t_i0, t_i0, 0);
        t_r0 = vRDTmp.a0;
        t_i0 = vIDTmp.a0;
        jj--;
        ii=0;
FFT_LT_INNER:
        for (i=0, i<Inner;i++)
        {
            AddLY0= ii+ii+Ping;
            AddLY1= ii+ii+Ping+1;
            AddSY0= ii+Pong;
            AddSY1= ii+Pong+Points_2;
            // printf ("%4d %4d %4d %4d %4d (%d %d) \n", jj,
AddLY0, AddSY0, AddSY1, Ping, Pong);
            ii++;
            r0     = vRMem [AddLY0];        // Load Data
from Vector memory
            r1     = vRMem [AddLY1];
            i0     = vIMem [AddLY0];
            i1     = vIMem [AddLY1];
            tmpr   = vphsub_m_s16 (r0, r1, jj);
            tmpi   = vphsub_m_s16 (i0, i1, jj);
            rr0    = vphadd_m_s16 (r0, r1, jj);
            ii0    = vphadd_m_s16 (i0, i1, jj);
                                // Multiply by twiddle values
            acc    = vqdmull_s16 (          tmpr, t_r0);
            rr1    = vqrdmlsh_s16 (acc, tmpi, t_i0);
            acc    = vqdmull_s16 (          tmpi, t_r0);
            ii1    = vqrdmlah_s16 (acc, tmpr, t_i0);
            vRMem [AddSY0]    =    rr0;
            vIMem [AddSY0]    =    ii0;
            vRMem [AddSY1]    =    rr1;
            vIMem [AddSY1]    =    ii1;
        }
        Ping ^=    Pong;
        Pong ^=    Ping;
        Ping ^=    Pong;
    }
```

The FFT butterfly calculations in the above program code use a combined unzip and subtract instruction "vphsub" and a combined unzip add operation "vphadd". Each of these combined instructions receives three input operands {r0, r1, jj} or {i0, i1, jj}. Subtractions are performed corresponding to r0−r1 and i0−i1 respectively, which are components of the output value B (complex number) in FIG. 8. Similarly two additions are performed corresponding to r0+r1 and i0+i1 representing components of the output vector A (complex number) in FIG. 8.

The results of the two addition operations are stored in the vectors rr0 and ii0 whereas the results of the combined unzip subtraction operations are stored in temporary variables (tmpr, tmpi) prior to multiplication by twiddle factors using separate program instructions (e.g. "vqdmull") as shown. In this program code the input operands to vphsub and vphadd instructions are vectors having dimensions SIMD_width. The parameter "jj", which is provided as an input operand to the vphsub and vphadd instructions, is the size parameter which specifies the number of data elements forming a rearrangement element. The value jj in the program code corresponds to $\log_2$ (step size) so that step size=$2^{jj}$. The combined rearrangement arithmetic instructions vphsub, vphadd are provided within a loop of program code of the FFT algorithm (jj is decremented for successive iterations of the loop).

A SIMD arithmetic operation can be performed in dependence upon a SIMD width specifying a number of data elements of the SIMD vector corresponding to an individual input operand for the purposes of the arithmetic operation. The SIMD width need not be equal to the full width of an input vector.

Figure 9A:
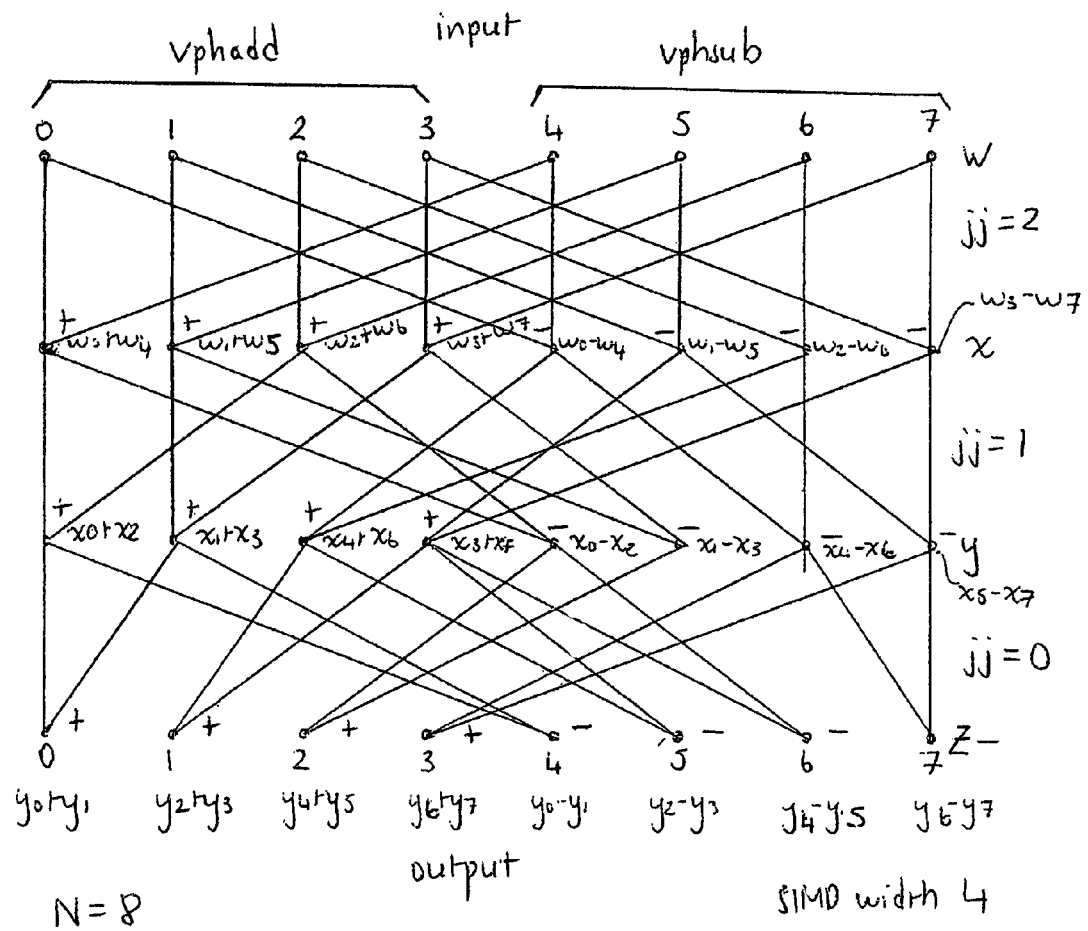
FIG. 9A schematically illustrates a butterfly diagram corresponding to Fast Fourier Transform calculation in which the number of input data samples is eight and the SIMD width is four data elements.

FIG. 9A schematically illustrates a butterfly diagram corresponding to an N=8 FFT for a SIMD width of four data elements. In this case there are three iterations of the loop of the calculation corresponding to jj=2, 1 and 0 respectively. For jj=2 the step size equals 4 so the rearrangement operation for the first round of the loop corresponds to an unzip operation with a step size of 4. In the same loop as the rearrangement operation a series of addition and subtraction operations are also performed as shown in the diagram. Thus an intermediate result vector at the end of the first iteration of the loop comprises an eight element vector, the first four elements of which correspond to addition operations and the second four elements of which correspond to subtraction operations. In particular, for input data elements w0, w1, w2, w3, w4, w5, w6, w7 the intermediate result vector for the first round of the loop are (w0+w4, w1+w5, w2+w6, w3+w7, w0−w4, w1−w5, w2−w6, w3−w7), which can be determined from the data-flow diagram of FIG. 9A (same principle as butterfly diagram of FIG. 8).

The second round of the calculation is a loop for which jj=1 so that the step size=2. If the intermediate result vector from the first iteration (specified above) is denoted x0, x1, x3, x4, x5, x6, x7 (where e.g. x0=w0+w4) then the intermediate result vector at the end of the second iteration of the loop is (x0 t x2, x1+x3, x4+x6, x5+x7, x0−x2, x1−x3, x4−x6, x5−x7). The last iteration of the loop corresponds to jj=0 and a step size of 1 and generates the results vector given by (y0+y1, y2+y3, y4+y5, y6+y7, y0−y1, y2−y3, y4−y5, y6−y7).

It can be seen that a different step size is used for each iteration of the loop although the same rearrangement operation (i.e. an unzip operation) is performed at each stage. The arithmetic operations comprise both an addition operation and a subtraction operation.

Figure 9B:
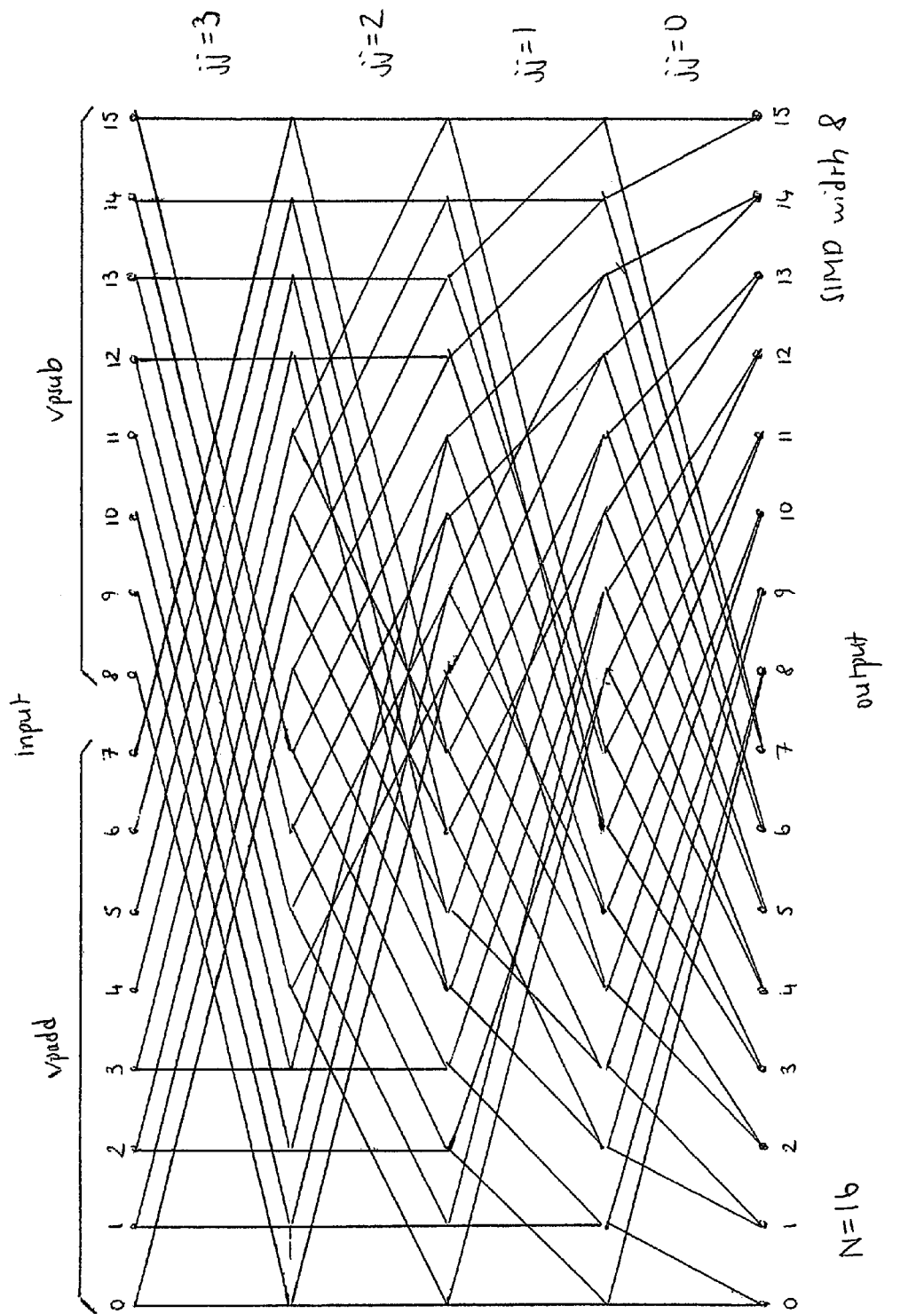
FIG. 9B schematically illustrates a butterfly diagram for a Fast Fourier Transform calculation in which the number of input data samples is sixteen and the SIMD width is eight data elements.

FIG. 9B schematically illustrates a butterfly diagram for FFT calculation in which the number of input data samples, N, is 16 and the SIMD width is 8. In this case, there are four iterations of the loop corresponding respectively to four different step sizes. In particular, for the first round of calculation jj=3 corresponds to a step size of 8; for the second round jj=2 corresponding to a step size of 4; for the third round jj=1 corresponding to a step size of 2; and for the final iteration of the loop jj=0 corresponding to a step size of 1.

In FIGS. 9A and 9B the right-hand half of the data flow diagram corresponds to operations performed by the vphsub instruction where the left-hand side of the butterfly corresponds to operations performed by the vphadd instruction of the above program code. Note: vphadd( ) is a variant of vpadd( ) where the output is halved to prevent overflow.

The combined rearrangement arithmetic instructions vphsub and vphadd according to the present technique enable the FFT calculation to be performed efficiently by enabling both the rearrangement and the arithmetic operations to be performed within the same loop of program code instead of separately performing the rearrangement instruction and then the arithmetic operations.

Combining the rearrangement operation and the arithmetic operation as shown in FIGS. 9A and 9B and in the above reproduced program code saves one instruction fetch, two register reads and two register writes relative to the use of two separate instructions to perform the rearrangement and the arithmetic operation respectively. The use of a combined instruction also allows for better code density and avoids the need for costly forwarding logic.

Figure 10:
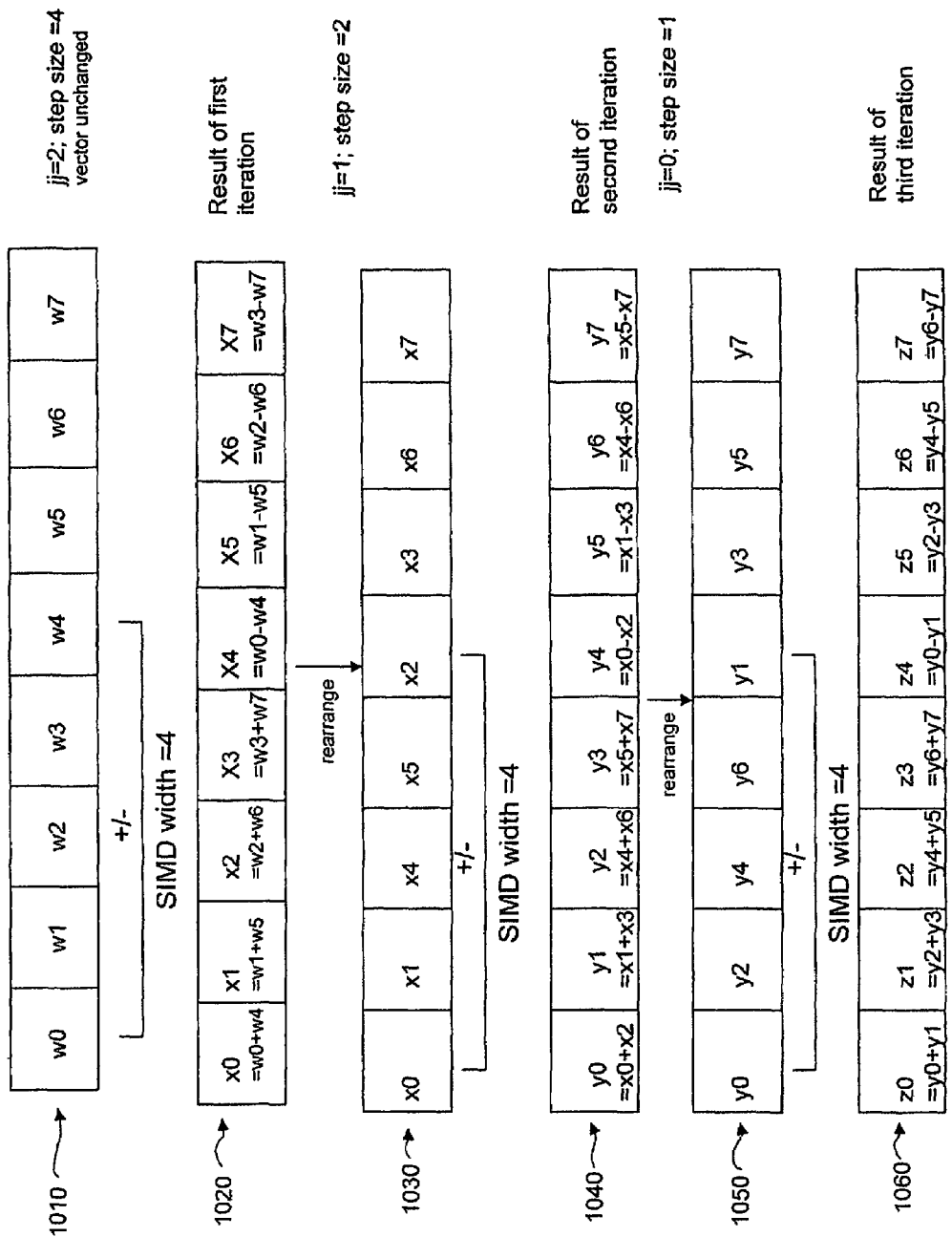
FIG. 10 schematically illustrates the rearrangement operations and arithmetic operations that are performed for each iteration of the butterfly diagram of FIG. 9A (N=8 and SIMD width=4)

FIG. 10 schematically illustrates the rearrangement instructions and arithmetic instructions that are performed for each iteration of the butterfly diagram of FIG. 9A (N=8 and SIMD width=4). Note that for simplicity (i.e. clarity of illustration) the twiddle multiplies have been omitted and just the add and subtract operations are shown. For the first iteration jj=2 and step size=4 so the unzip operation leaves the input vector w unchanged. The SIMD width of 4 means that there is a separation of 4 data elements between the pairs of operands for each addition and subtraction operation (e.g. w0+w4, w0−w4). The intermediate result vector 1020 shows the result of the first iteration. In this case the first four data-elements of the vector correspond to additions and the second four data-elements of the vector correspond to subtractions. For the second iteration of the loop, jj=1 and step size=2. Prior to performing the arithmetic operations on the second iteration, a rearrangement operation is performed on the input vector to this stage (i.e. vector 1020). The rearrangement reorders the elements of the input vector 1020 as shown to produce the rearranged vector 1030. Note that the rearrangement units comprise adjacent pairs of data elements for this iteration. The addition and subtraction operations with a data-element separation of 4 (SIMD width=4) are performed on data elements of vector 1030 to give vector 1040 as the final result vector of the second iteration. For the final round of calculations jj=0 corresponding to a step size of 1. The rearranged vector 1050 is generated from vector 1040. Note that the rearrangement unit corresponds to a single data-element for this iteration. Four additions and four subtractions are performed in order to generate the final result of the third iteration, vector 1060.

Whilst the above described techniques may be performed by hardware executing a sequence of native instructions which include the above-mentioned instructions, it will be appreciated that in alternative embodiments, such instructions may be executed in a virtual machine environment, where the instructions are native to the virtual machine, but the virtual machine is implemented by software executing on hardware having a different native instruction set. The virtual machine environment may provide a full virtual machine environment emulating execution of a full instruction set or may be partial, e.g. only some instructions, including the instructions of the present technique, are trapped by the hardware and emulated by the partial virtual machine.

More specifically, the above-described re-arrangement arithmetic instructions may be executed as native instructions to the full or partial virtual machine, with the virtual machine together with its underlying hardware platform operating in combination to provide the processing circuitry and control circuitry described above.

Figure 11:
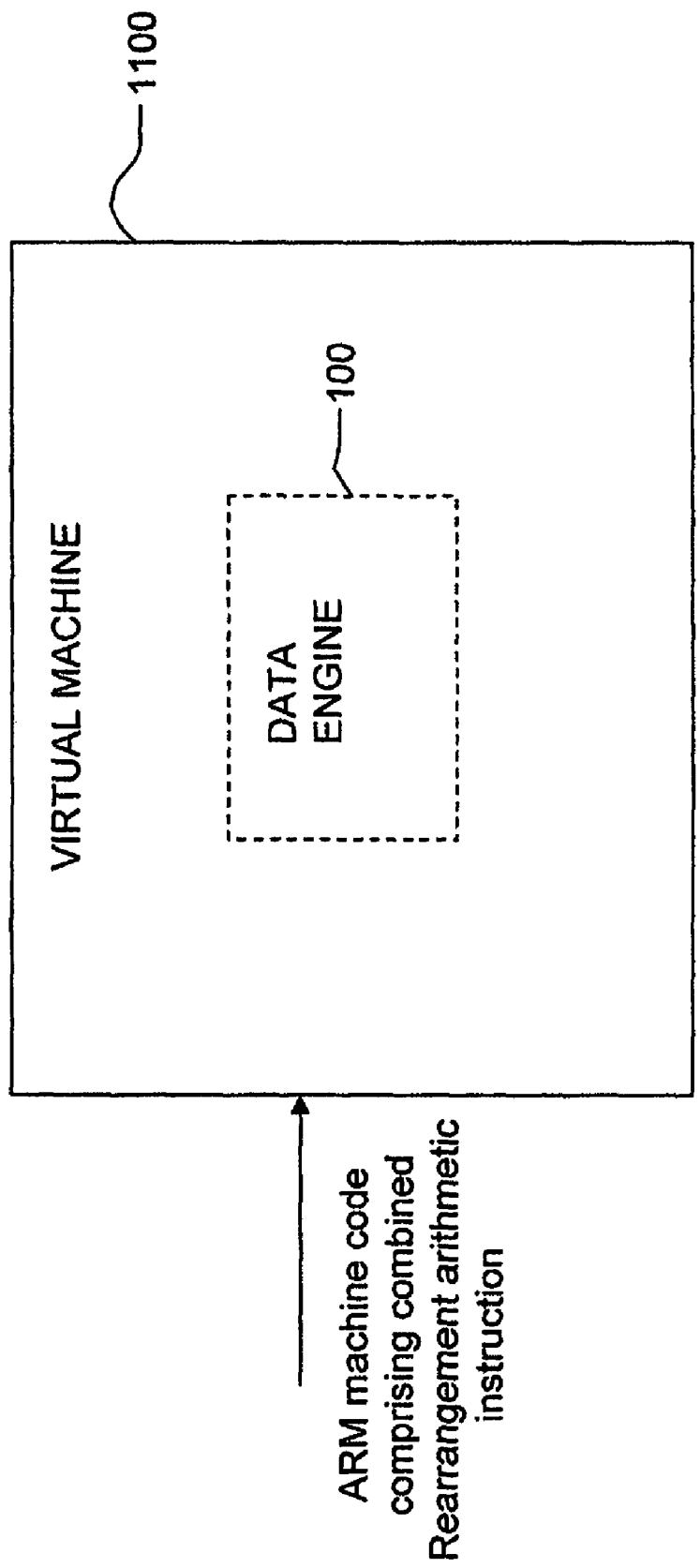
FIG. 11 schematically illustrates a virtual machine implementation of the data engine 100 of FIG. 1.

FIG. 11 schematically illustrates a virtual machine implementation of the data engine 100 of FIG. 1. The arrangement comprises a virtual machine 1100 arranged to emulate operation of the data engine 100. The virtual machine 1100 (e.g. emulating an ARM processor or data engine) is arranged to receive machine code (e.g. ARM machine code) including combined rearrangement arithmetic instructions in accordance with the present technique for which it emulates execution. If a general purpose processor on which the virtual machine is to be run is of sufficiently high performance, then realistic overall processing throughput may be achieved and the advantages of being able to execute an existing code base including combined rearrangement arithmetic instructions in accordance with the present technique may justify the use of a general purpose processor in this way.

Although a particular embodiment has been described herein, it will be appreciated that the claims are not limited thereto and that many modifications and additions thereto may be made within the scope of the claims.

Although illustrative example embodiments have been described in detail herein with reference to the accompanying drawings, it is to be understood that the claims are not limited to those precise embodiments, and that various changes and modifications can be effected therein by one skilled in the art without departing from the scope and spirit of the appended claims.

We claim:

1. Apparatus for processing data, said apparatus comprising:
    (i) processing circuitry configured to perform data processing operations comprising scalar processing circuitry for performing scalar operations and SIMD processing circuitry for performing SIMD operations;
    (ii) a register bank having a plurality of registers for storing data;
    (iii) control circuitry responsive to program instructions to control said processing circuitry to perform said data processing operations;
    wherein said control circuitry is configured to be responsive to a combined rearrangement arithmetic instruction to control said processing circuitry to perform a rearrangement operation and at least one SIMD arithmetic operation on a plurality of data elements corresponding to data stored in one or more registers of said register bank, said rearrangement operation being configurable by a size parameter derived at least in part from said register bank, said size parameter providing an indication of a number of data elements forming a rearrangement element for said rearrangement operation.

2. Apparatus as claimed in claim 1, wherein said control circuitry is configured such that said rearrangement operation is performed prior to performing said at least one SIMD arithmetic operation.

3. Apparatus as claimed in claim 1, wherein said control circuitry is configured such that said at least one SIMD arithmetic operation is performed prior to performing said rearrangement operation.

4. Apparatus as claimed in claim 1, wherein said at least one SIMD arithmetic operation is at least one of an addition, a subtraction, a maximum determination, a minimum determination and an add-compare-select operation.

5. Apparatus as claimed in claim 1, wherein said rearrangement operation is one of an interleave operation, a deinterleave operation, a transpose operation, a duplication operation and a reverse operation.

6. Apparatus as claimed in claim 1, wherein said size parameter is an input argument of said combined rearrangement arithmetic instruction.

7. Apparatus as claimed in claim 1, wherein said register bank comprises a scalar register bank for access by said scalar processing circuitry and a SIMD register bank for access by said SIMD processing circuitry and wherein said data processing apparatus comprises transfer circuitry for transferring said size parameter from a storage location in said scalar register bank to said SIMD processing circuitry.

8. Apparatus as claimed in claim 1, wherein said SIMD processing circuitry processes one or more operands comprising packed SIMD vectors, each packed SIMD vector comprising a plurality of data elements and wherein said combined rearrangement arithmetic instruction takes a plurality of said packed SIMD vectors as input operands.

9. Apparatus as claimed in claim 8, wherein said rearrangement element comprises two or more of said data elements and wherein said two or more data elements forming said rearrangement element comprises a group of data elements having adjacent positions in one of said packed SIMD vectors.

10. Apparatus as claimed in claim 8, wherein said processing circuitry is responsive to said combined arithmetic rearrangement instruction to perform said rearrangement operation across a number of data elements corresponding to two or more of said plurality of packed SIMD vectors.

11. Apparatus as claimed in claim 10, wherein said loop of program instructions forms part of one of a Viterbi decoding algorithm, a Fast Fourier Transform algorithm and a Turbo decoding algorithm.

12. Apparatus as claimed in claim 8, wherein said control circuitry is configured such that said at least one SIMD arithmetic operation is performed prior to performing said rearrangement operation and wherein said at least one SIMD arithmetic operation comprises at least two different SIMD arithmetic operations and wherein said processing circuitry is responsive to said combined arithmetic rearrangement instruction to perform said rearrangement operation across a plurality of said packed SIMD vectors comprising results of said at least two different SIMD arithmetic operations.

13. Apparatus as claimed in claim 1, wherein said rearrangement element comprises two or more of said data elements.

14. Apparatus as claimed in claim 1 wherein said combined rearrangement arithmetic instruction is provided within a loop of program instructions and wherein said scalar processing circuitry is configured to calculate an updated value of said size parameter for supply to said SIMD processing circuitry for successive iterations of said loop.

15. Apparatus as claimed in claim 14 wherein said scalar processing circuitry and said SIMD processing circuitry are synchronised such that said scalar processing circuitry operates in parallel with said SIMD processing circuitry to supply said updated value to said SIMD processing circuitry for each of said successive iterations of said loop.

16. Apparatus as claimed in claim 1, wherein said data processing apparatus is a digital signal processor.

17. Apparatus as claimed in claim 1, wherein said data processing apparatus is a co-processor.

18. A method of performing combined rearrangement operations and SIMD operations using a data processing apparatus having register bank having a plurality of registers for storing data, processing circuitry for performing data processing operations and control circuitry for controlling the processing circuitry, said processing circuitry comprising scalar processing circuitry for performing scalar operations and SIMD processing circuitry for performing SIMD operations, said method comprising the steps of:
   (i) in response to a combined rearrangement arithmetic instruction, controlling said processing circuitry to perform a rearrangement operation and at least one SIMD arithmetic operation on a plurality of data elements stored in said register bank;
   (ii) providing a size parameter derived at least in part form said register bank, said size parameter providing an indication of a number of data elements forming a rearrangement element for said rearrangement operation and configuring said rearrangement operation using said size parameter.

19. A computer program product comprising a computer program for controlling a computer to perform a method as claimed in claim 18, said computer program comprising at least one combined rearrangement arithmetic instruction.

20. A virtual machine providing an emulation of an apparatus for processing data, said apparatus comprising:
   (i) processing circuitry configured to perform data processing operations comprising scalar processing circuitry for performing scalar operations and SIMD processing circuitry for performing SIMD operations;
   (ii) a register bank having a plurality of registers for storing data;
   (iii) control circuitry responsive to program instructions to control said processing circuitry to perform said data processing operations;
   wherein said control circuitry is configured to be responsive to a combined rearrangement arithmetic instruction to control said processing circuitry to perform a rearrangement operation and at least one SIMD arithmetic operation on a plurality of data elements corresponding to data stored in one or more registers of said register bank, said rearrangement operation being configurable by a size parameter derived at least in part from said register bank, said size parameter providing an indication of a number of data elements forming a rearrangement element for said rearrangement operation.

21. Apparatus for processing data, said apparatus comprising:
   (i) means for performing data processing operations comprising scalar processing circuitry for performing scalar operations and SIMD processing circuitry for performing SIMD operations;
   (ii) means for storing data;
   (iii) means for controlling being responsive to program instructions to control said means for performing data processing operations to perform said data processing operations;
   wherein said means for controlling is arranged to be responsive to a combined rearrangement arithmetic instruction tb control said means for performing data processing operations to perform a rearrangement operation and at least one SIMD arithmetic operation on a plurality of data elements corresponding to data stored in said means for storing, said rearrangement operation being configurable by a size parameter derived at least in part from said means for storing, said size parameter providing an indication of a number of data elements forming a rearrangement element for said rearrangement operation.

* * * * *